(12) United States Patent
Gugulothu et al.

(10) Patent No.: US 11,556,789 B2
(45) Date of Patent: Jan. 17, 2023

(54) TIME SERIES PREDICTION WITH CONFIDENCE ESTIMATES USING SPARSE RECURRENT MIXTURE DENSITY NETWORKS

(71) Applicant: Tata Consultancy Services Limited, Mumbai (IN)

(72) Inventors: Narendhar Gugulothu, Hyderabad (IN); Easwara Naga Subramanian, Hyderabad (IN); Sanjay Purushottam Bhat, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 318 days.

(21) Appl. No.: 16/909,262

(22) Filed: Jun. 23, 2020

(65) Prior Publication Data

US 2020/0401888 A1 Dec. 24, 2020

(30) Foreign Application Priority Data

Jun. 24, 2019 (IN) .............................. 201921025035

(51) Int. Cl.
*G06N 3/08* (2006.01)
*G06N 3/04* (2006.01)

(52) U.S. Cl.
CPC ............. *G06N 3/08* (2013.01); *G06N 3/0445* (2013.01)

(58) Field of Classification Search
CPC ...... G06N 3/08; G06N 3/0445; G06N 3/0472; G06N 3/084; G06N 3/0454
See application file for complete search history.

(56) References Cited

FOREIGN PATENT DOCUMENTS

CN 109345021 A 2/2019

OTHER PUBLICATIONS

Rose S. A Machine Learning Framework for Plan Payment Risk Adjustment. Health Serv Res. Dec. 2016;51(6):2358-2374. doi: 10.1111/1475-6773.12464. Epub Feb. 1, 20169. PMID: 26891974; PMCID: PMC5134202 (Year: 2016).*

(Continued)

*Primary Examiner* — Shon G Foley
(74) *Attorney, Agent, or Firm* — Finnegan, Henderson, Farabow, Garrett & Dunner, LLP

(57) ABSTRACT

This disclosure relates generally to system and method for time series prediction using a sparse recurrent mixture density network (RMDN), such as sparse LSTM-MDN and a sparse ED-MDN, for accurate forecasting of a high variability time series. The disclosed sparse RMDN has the ability to handle high-dimensional input features, capture trend shifts and high variability present in the data, and provide a confidence estimate of the forecast. A high-dimensional time series data is passed through a feedforward layer, which performs dimensionality reduction in an unsupervised manner by inducing sparsity on weights of the feedforward layer. The resultant low-dimensional time series is fed through recurrent layers to capture temporal patterns. These recurrent layers also aid in learning latent representation of the input data. Thereafter, a mixture density network (MDN) is used to model the variability and trend shifts present in the input and it also estimates the confidence of the predictions.

11 Claims, 9 Drawing Sheets

(56) References Cited

OTHER PUBLICATIONS

Kashiparekh, Kathan, et al. "Convtimenet: A pre-trained deep convolutional neural network for time series classification." 2019 International Joint Conference on Neural Networks (IJCNN). IEEE, 2019 (Year: 2019).*

Mukherjee, S. et al. (2018). "AR-MDN: Associative and Recurrent Mixture Density Networks for eRetail Demand Forecasting," retrieved from https://www.researchgate.net/publication/323722640_ARMDN_Associative_and_Recurrent_Mixture_Density_Networks_for_eRetail_Demand_Forecasting (13 pages).

Felder, M. et al. (2010). "Wind power prediction using mixture density recurrent neural networks," retrieved from https://www.researchgate.net/publication/268433998_Wind_power_prediction_using_mixture_density_recurrent_neural_networks (8 pages).

Bazzani, L. et al. "Recurrent Mixture Density Network for Spatiotemporal Visual Attention," *5th International Conference on Learning Representations*, Apr. 24-26, 2017, Palais des Congrès Neptune, France; 15 pages.

Xu, J. et al. "A Sequence Learning Model with Recurrent Neural Networks for Taxi Demand Prediction," 2017 *IEEE 42nd Conference on Local Computer Networks (LCN)*, Oct. 9-12, 2017, Singapore; 8 pages.

\* cited by examiner

Table 1. Datasets details

| Dataset | Window length | Prediction length | Input dimensions | Total windows | Sampling rate (hrs) |
|---|---|---|---|---|---|
| AEMO | 144 | 48 | 31 | 680 | 0.5 |
| HomeA | 72 | 24 | 53 | 217 | 1.0 |
| PowerTAC | 72 | 24 | 24 | 1270 | 1.0 |

Table 2. Performance comparison of proposed sparse RMDN based forecasting models.

| Dataset / Approach | AEMO | | HomeA | | MedicalCenter-1 | | CentervilleHomes | | BrooksideHomes | |
|---|---|---|---|---|---|---|---|---|---|---|
| | MSE | MAPE | MSE | MAPE | MSE | MAPE | MSE | MAPE | MSE | MAPE |
| Standard LSTM | 0.00159 | 9.03186 | 0.00182 | 46.98303 | 0.00550 | 17.71834 | 0.00159 | 12.6512 | 0.00276 | 30.47002 |
| Standard ED | 0.00257 | 11.00555 | 0.00172 | 44.10512 | 0.00586 | 17.5874 | 0.00165 | 13.35113 | 0.00275 | 29.24032 |
| Sparse LSTM | 0.00137 | 8.66642 | 0.00113 | 42.77446 | 0.00560 | 18.5516 | 0.00162 | 12.1824 | 0.00286 | 28.94780 |
| Sparse ED | 0.00170 | 9.25787 | 0.00177 | 43.95304 | 0.00610 | 19.5624 | 0.00154 | 13.02470 | 0.00273 | 31.46647 |
| LSTM-MDN | 0.00227 | 10.36923 | 0.00265 | 26.36024 | 0.00559 | 17.22559 | 0.00157 | 13.08838 | 0.00208 | 28.93074 |
| ED-MDN | 0.00199 | 9.37978 | 0.00881 | 35.16026 | 0.00567 | 17.26241 | 0.00155 | 12.17745 | 0.00277 | 28.51284 |
| Sparse LSTM-MDN | 0.00167 | 9.14346 | 0.00188 | 25.64572 | 0.00553 | 18.54566 | 0.00150 | 11.96106 | 0.00281 | 26.81967 |
| Sparse ED-MDN | 0.00178 | 9.19194 | 0.00170 | 29.37821 | 0.00536 | 18.44036 | 0.00153 | 12.42878 | 0.00289 | 27.03677 |
| Ensemble | 0.00134 | 8.07125 | 0.01015 | 34.10546 | 0.00510 | 17.11900 | 0.00139 | 11.74229 | 0.00242 | 27.27441 |

FIG. 4

TIME SERIES PREDICTION WITH CONFIDENCE ESTIMATES USING SPARSE RECURRENT MIXTURE DENSITY NETWORKS

PRIORITY CLAIM

This U.S. patent application claims priority under 35 U.S.C. § 119 to: India Application No. 201921025035, filed on Jun. 24, 2019. The entire contents of the aforementioned application are incorporated herein by reference.

TECHNICAL FIELD

This disclosure relates generally to time series prediction, and more particularly to system and method for time series prediction with confidence estimates using sparse recurrent mixture density networks (RMDN).

BACKGROUND

Accurate forecasting of a high variability time series has relevance in many applications such as supply-chain management, price prediction in stock markets and demand forecasting in energy segment. Most often forecasts of such time series depend on many factors ranging from weather to socio-economic attributes such as Gross Domestic Product (GDP) or average income. Dependence on such features can cause the underlying time series to be highly variable in nature and possess non-stationary shifts. Most traditional forecasting methods fail to capture such trend change and high variability present in the data. Further, for certain applications, it may be necessary to estimate confidence of the forecasts.

SUMMARY

Embodiments of the present disclosure present technological improvements as solutions to one or more of the above-mentioned technical problems recognized by the inventors in conventional systems. For example, in one embodiment, a method for time-series prediction using a sparse recurrent mixture density networks (RMDN) model is provided. The method includes iteratively predicting, via one or more hardware processors, time series in a plurality of iterations using a data set comprising a plurality of high-dimensional time series, the plurality of high-dimensional time series comprising a first set of high-dimensional time series associated with a training data and a second set of the high-dimensional time series associated with a validation data. Each iteration of the plurality of iterations includes passing, through a feedforward layer of the sparse RMDN model, a high-dimensional time series from amongst the plurality of high-dimensional time series, the sparse RMDN model comprising the feedforward layer, a recurrent neural network (RNN) and a mixture density network (MDN), the feedforward layer comprising a plurality of units associated with a plurality of distinct weights learnt by training the sparse RMDN model. The sparse RMDN model is trained by imposing Lasso penalty on the plurality of weights of the feedforward layer to determine a set of features associated with the time series in an unsupervised manner. Dimensionality reduction of the high-dimensional time series is performed to obtain a reduced dimensional time series The feedforward layer includes a number of the plurality of units equal to a fraction of the number of features in the set of features to perform the dimensionality reduction. The reduced dimensional time series is fed through the RNN to obtain latent representation of the high-dimensional time-series. The latent representation captures temporal patterns from the reduced dimensional time series.

The latent representation of the high-dimensional time series is fed to a mixture of Gaussians includes a plurality of Gaussian components to predict a plurality of parameters associated with the plurality of Gaussian components in the mixture. The plurality of parameters includes a plurality of probability values, a plurality of mean values and a plurality of standard deviation values associated with the plurality of the Gaussian components. A Gaussian component is selected from amongst the plurality of Gaussian components that is associated with a highest value of probability from amongst the plurality of probability values, wherein the mean of the selected Gaussian component is selected as prediction of the time-series and the standard deviation of the Gaussian component is selected for confidence estimation of the prediction for the iteration. A value of a loss function indicative of error in the prediction of the time-series is computed using the plurality of parameters, the loss function being one of a training loss function and a validation loss function. The method further includes updating, via the one or more hardware processors, a plurality of weights of the sparse RMDN model using the value of the training loss function after each iteration of the plurality of iterations associated with the training data for prediction of the time-series.

In another aspect, a system for time-series prediction using a sparse recurrent mixture density networks (RMDN) model is provided. The system includes one or more memories; and one or more first hardware processors, the one or more first memories coupled to the one or more first hardware processors, wherein the one or more first hardware processors are configured to execute programmed instructions stored in the one or more first memories to iteratively predict time series in a plurality of iterations using a data set comprising a plurality of high-dimensional time series, the plurality of high-dimensional time series comprising a first set of high-dimensional time series associated with a training data and a second set of the high-dimensional time series associated with a validation data.

Each iteration of the plurality of iterations includes passing, through a feedforward layer of the sparse RMDN model, a high-dimensional time series from amongst the plurality of high-dimensional time series, the sparse RMDN model comprising the feedforward layer, a recurrent neural network (RNN) and a mixture density network (MDN), the feedforward layer comprising a plurality of units associated with a plurality of distinct weights learnt by training the sparse RMDN model. The sparse RMDN model is trained by imposing Lasso penalty on the plurality of weights of the feedforward layer to determine a set of features associated with the time series in an unsupervised manner. Dimensionality reduction of the high-dimensional time series is performed to obtain a reduced dimensional time series The feedforward layer includes a number of the plurality of units equal to a fraction of the number of features in the set of features to perform the dimensionality reduction. The reduced dimensional time series is fed through the RNN to obtain latent representation of the high-dimensional time-series. The latent representation captures temporal patterns from the reduced dimensional time series.

The latent representation of the high-dimensional time series is fed to a mixture of Gaussians includes a plurality of Gaussian components to predict a plurality of parameters associated with the plurality of Gaussian components in the mixture. The plurality of parameters includes a plurality of probability values, a plurality of mean values and a plurality of standard deviation values associated with the plurality of the Gaussian components. A Gaussian component is selected from amongst the plurality of Gaussian components that is associated with a highest value of probability from amongst the plurality of probability values, wherein the mean of the selected Gaussian component is selected as prediction of the time-series and the standard deviation of the Gaussian component is selected for confidence estimation of the prediction for the iteration. A value of a loss function indicative of error in the prediction of the time-series is computed using the plurality of parameters, the loss function being one of a training loss function and a validation loss function. The one or more first hardware processors are configured to execute programmed instructions update a plurality of weights of the sparse RMDN model using the value of the training loss function after each iteration of the plurality of iterations associated with the training data for prediction of the time-series.

In yet another aspect, a non-transitory computer readable medium for a method for time-series prediction using a sparse recurrent mixture density networks (RMDN) model is provided. The method includes iteratively predicting, via one or more hardware processors, time series in a plurality of iterations using a data set comprising a plurality of high-dimensional time series, the plurality of high-dimensional time series comprising a first set of high-dimensional time series associated with a training data and a second set of the high-dimensional time series associated with a validation data. Each iteration of the plurality of iterations includes passing, through a feedforward layer of the sparse RMDN model, a high-dimensional time series from amongst the plurality of high-dimensional time series, the sparse RMDN model comprising the feedforward layer, a recurrent neural network (RNN) and a mixture density network (MDN), the feedforward layer comprising a plurality of units associated with a plurality of distinct weights learnt by training the sparse RMDN model. The sparse RMDN model is trained by imposing Lasso penalty on the plurality of weights of the feedforward layer to determine a set of features associated with the time series in an unsupervised manner. Dimensionality reduction of the high-dimensional time series is performed to obtain a reduced dimensional time series The feedforward layer includes a number of the plurality of units equal to a fraction of the number of features in the set of features to perform the dimensionality reduction. The reduced dimensional time series is fed through the RNN to obtain latent representation of the high-dimensional time-series. The latent representation captures temporal patterns from the reduced dimensional time series.

The latent representation of the high-dimensional time series is fed to a mixture of Gaussians includes a plurality of Gaussian components to predict a plurality of parameters associated with the plurality of Gaussian components in the mixture. The plurality of parameters includes a plurality of probability values, a plurality of mean values and a plurality of standard deviation values associated with the plurality of the Gaussian components. A Gaussian component is selected from amongst the plurality of Gaussian components that is associated with a highest value of probability from amongst the plurality of probability values, wherein the mean of the selected Gaussian component is selected as prediction of the time-series and the standard deviation of the Gaussian component is selected for confidence estimation of the prediction for the iteration. A value of a loss function indicative of error in the prediction of the time-series is computed using the plurality of parameters, the loss function being one of a training loss function and a validation loss function. The method further includes updating, via the one or more hardware processors, a plurality of weights of the sparse RMDN model using the value of the training loss function after each iteration of the plurality of iterations associated with the training data for prediction of the time-series.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 illustrates tables for comparison of the proposed sparse RMDN with forecasting models in accordance with some embodiments of the present disclosure.

DETAILED DESCRIPTION

Figure 1:
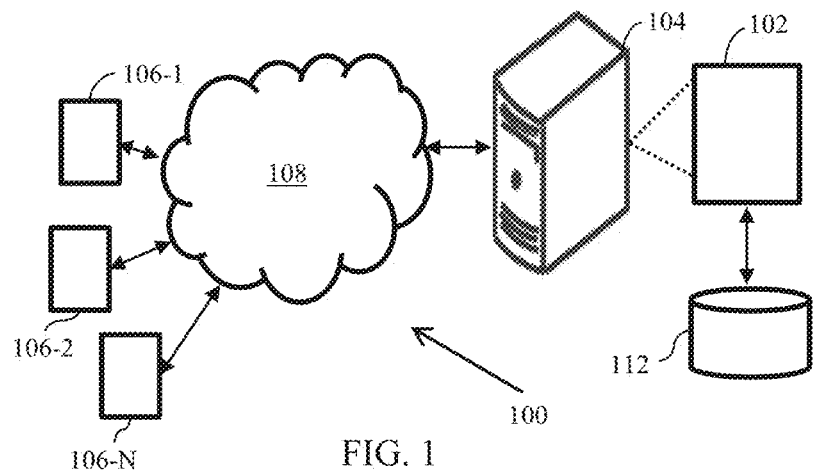
FIG. 1 illustrates an example network implementation of a system for time series prediction using sparse RMDN, in accordance with some embodiments of the present disclosure.

In applications such as supply-chain logistics, stock price prediction or load forecasting in energy markets, it is imperative for the prediction model to be accurate and possess the ability to handle high-dimensional data with trend shifts and variability. An example implementation of a prediction model is that in a load forecasting problem. Accuracy in load prediction is critical for maintaining the balance between supply and demand of electricity. Any imbalance in the energy network can be costly to all the players in the market. Further, energy consumption pattern of retail or wholesale customers are typically highly variable in nature with trend shifts that depend on various factors such as weather, historical consumption patterns and other socio-economic indicators. It is critical to predict the future demand well ahead in time. This would help the power manufacturing companies and electricity brokers to manage demand volatility and imbalances better. Also, dependence of the consumption pattern on aforementioned factors results in high-dimensional data. The ability of a model to provide the confidence estimate of its forecast is useful for power generators and electricity brokers to manage demand volatility and imbalances better.

Conventionally, Recurrent neural networks (RNNs), especially those RNNs based on long short-term memory (LSTM) or gated recurrent units, are used for sequential modeling tasks due to their ability to capture temporal patterns. RNN-based networks are capable of capturing long-term dependencies, and hence are relevant in forecasting problems. These models have achieved state-of-the-art performance on sequence modeling tasks such as machine translation, speech recognition, remaining useful life estimation and anomaly detection.

Recurrent mixture density network (RMDN) based models have outperformed other existing RNN based approaches on tasks such as sequence generation, trajectory generation, surgical motion prediction, visual attention and in anomaly detection. The use of mixture density networks (MDNs) along with LSTMs for modeling the variance of predicted demand has also been utilized for supply-demand logistics. The LSTMs along with MDNs have been used to predict, for example, taxi demand. However, the aforementioned models do not have any inherent mechanism to handle high-dimensional data.

Typical approaches to load forecasting problems have generally been based on econometric and time series methods. Various data driven models that use deep neural networks have also been utilized for load forecasting due to their generalizability and superior prediction capability. However, these approaches follow a two-stage process to handle high-dimensional data. The first stage has the mechanism to determine important features from high-dimensional data and the second stage uses the important features as input to the forecasting model. Typical approaches used to determine important features in the first stage includes for instance, random forest, wrapper and embedding based recursive feature elimination technique, and so on. The important features obtained from the first stage are then fed as input to the LSTM-based forecasting models in the second stage. However, such techniques do not have an inherent mechanism to handle high-dimensional data nor do they provide confidence estimates of the forecasted demand.

Various embodiments herein provide system and method to handle high-dimensional data for time series prediction with confidence estimates using sparse RMDN architectures. For example, in an embodiment, the disclosed system utilizes sparse RMDNs for time series prediction that output p-step ahead forecast. In various embodiments, two variants of the RMDN architectures, namely long short-term memory (LSTM) and encoder-decoder (ED) have been utilized for prediction of time-series. The disclosed system includes a fully connected feedforward layer, RNN (LSTM or ED networks), and mixture density network (MDN). The fully connected feedforward layer automatically selects salient features of the data associated with the time-series. In an embodiment, the feedforward layer, upon training, produces a sparse representation of the input data that is subsequently fed to the underlying LSTM or ED networks. The sparse representation is achieved by introducing sparsity constraint (or a L1 constraint) on the weights of the feedforward layer, so that, each unit in the feedforward layer has access to only a subset of the input features. By imposing the sparsity constraint on the weights of feedforward layer, the feedforward dimensionality reduction layer handles high-dimensional input data, thereby effectively resulting in unsupervised feature selection. RNNs (LSTM or ED networks) are used to capture the temporal patterns present in the time series data. Finally, mixture density networks are used to model the trend shifts and variability present in the data and provide a confidence estimate of the prediction. Additionally, the sparse RMDN provides a confidence estimate of the forecast. These are other aspects of the disclosed embodiments are explained further in detail with reference to the description below with reference to FIGS. 1-6.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

FIG. 1 illustrates an example network implementation 100 of a system 102 for time series prediction using sparse RMDN, in accordance with an example embodiment. In an embodiment, the system 102 may include a sparse RMDN architecture for the purpose of time-series forecasting. In an embodiment, the sparse RMDN may include long-short term memory (LSTM) or encoder-decoder (ED) as the underlying recurrent architectures. For example, the sparse RMDN model may include a sparse LSTM-MDN architecture. In another example embodiment, the sparse RMDN model may include a sparse ED-MDN architecture. The sparse LSTM-MDN architecture and the sparse ED-MDN architecture for time-series forecasting are explained in detail with reference to FIGS. 2A and 2B.

The disclosed sparse LSTM-MDN architecture and the sparse ED-MDN architecture models perform point-wise dimensionality reduction using the feedforward layer and capture the temporal patterns using the underlying RNNs. These architectures can handle variability and trend shifts present in the data and also output a confidence estimate for the forecast. An important contribution of the disclosed embodiments is the ability to the disclosed system handle high-dimensional input features. A salient feature of the aforementioned sparse RMDN models is that they have a built in feedforward layer which effectively performs dimensionality reduction or feature selection of the input data in an unsupervised manner. In other words, the inner recurrent layers of the sparse RMDN get a sparse representation of the input data, from the preceding feedforward layer. Inputs to the sparse RMDN architecture are first passed through a feedforward layer that introduces sparsity in the input data before being fed to the subsequent recurrent layers. In an embodiment, the sparsity can be induced by adding a regularization term to the cost function associated with the network, as will be described further in the description below.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2A, 2B.

Figure 2A:
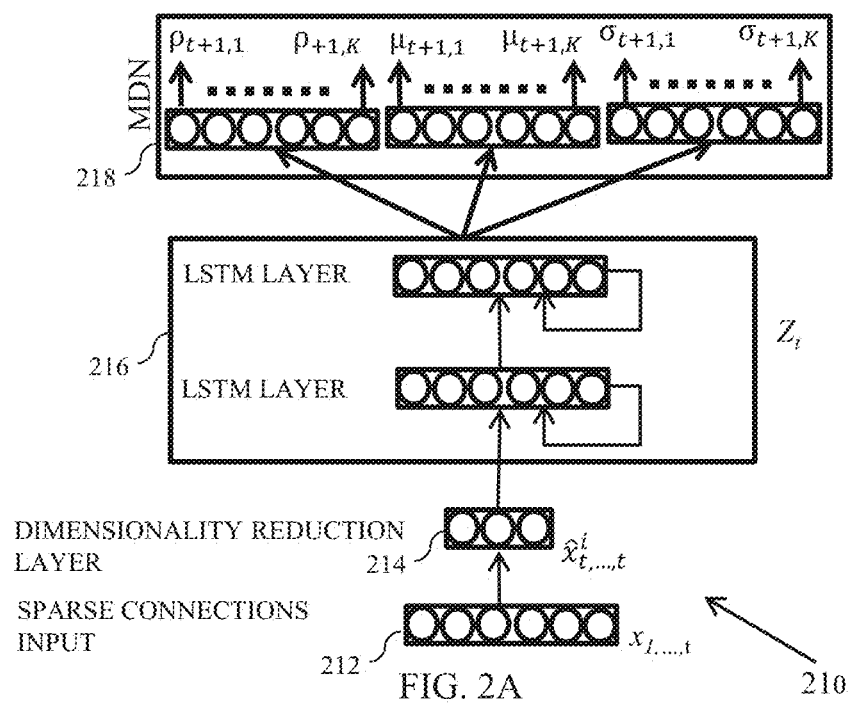
FIGS. 2A, 2B illustrates example representation of sparse RMDN models for time series prediction with confidence estimates, in accordance with some embodiments of the present disclosure.
Figure 2B:
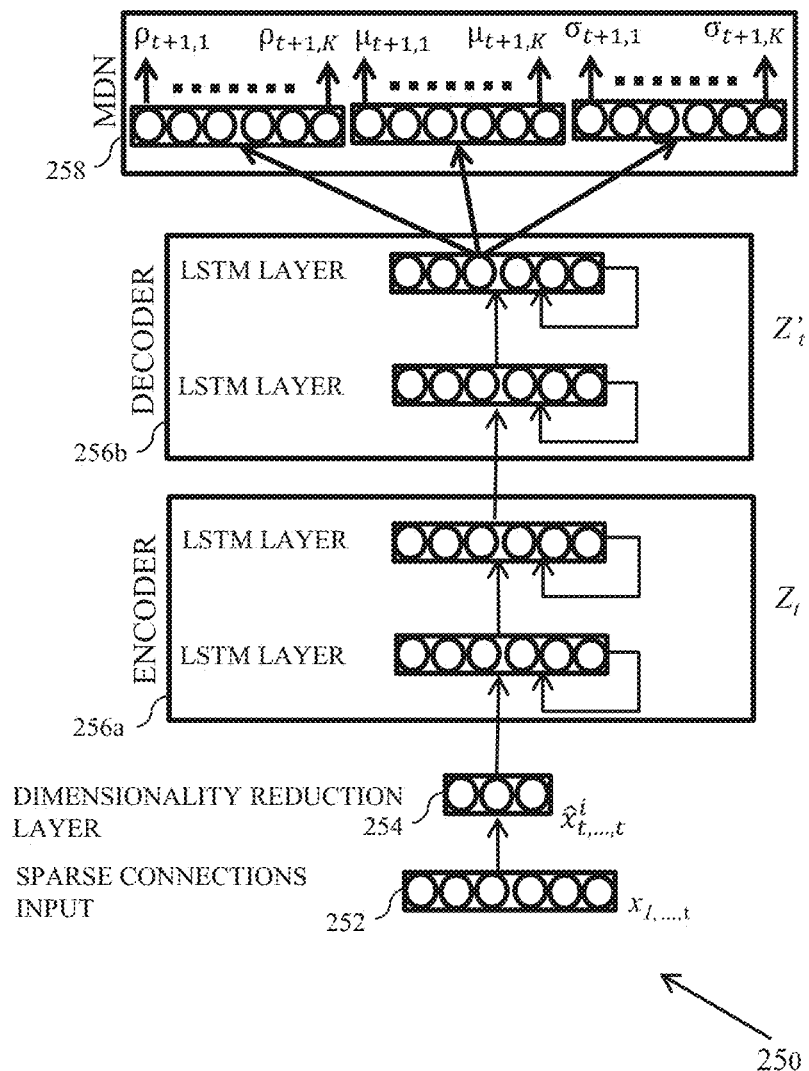

Referring now to FIGS. 2A and 2B, example sparse RMDN architectures/model for time series prediction with confidence estimates are illustrated, in accordance with an example embodiment. For example, FIG. 2A illustrates a sparse LSTM-MDN architecture/model 210 and FIG. 2B illustrates an ED network 250 for time series prediction in accordance with an example embodiment.

As previously discussed, the time series prediction can be performed by neural networks including LSTM or ED. An LSTM is a recurrent neural network with a cell or memory, an input gate, an output gate, and a forget gate. The role of the cell is to extract temporal relations of the input sequence, while the gates regulate the information flow in and out of the LSTM cell. An ED is a seq2seq learning model that contains a pair of RNNs (called encoder and decoder) which are trained simultaneously. Given the input time series the encoder learns a latent representation $z_t$ of the time series. The decoder, which has the same structure as the encoder, decodes the hidden state $z_t$ to predict $y'_{t+1}, \ldots, _{t+p}$. However, both LSTM and ED based models do not capture trend shifts very well. It is also difficult to capture variability very well when these networks are trained using a mean squared error objective function, which is equivalent to maximum likelihood estimation under the assumption that the underlying distribution is Gaussian. Furthermore, LSTM and ED models do not have an inherent mechanism to handle high-dimensional data and perform unsupervised feature selection. In order to address the aforementioned shortcomings, various embodiments herein disclose use of sparse RNN based MDNs, such as sparse LSTM-MDN and sparse ED-MDN networks for time series prediction.

In an embodiment, the disclosed sparse RNN based MDNs performs automatic feature selection of the high-dimensional input data (represented as 212 in FIG. 2A and 252 in FIG. 2B) in an unsupervised fashion by using feedforward dimensionality reduction layer (for example, layer 214 of FIG. 2A/layer 254 of FIG. 2B). The disclosed sparse RMDN captures the temporal patterns present in the data with the help of underlying RNNs present in the models. Moreover, the disclosed sparse RMDN captures trend shifts and variability present in the input data with the help of the MDN.

For the purpose of description, the time series of length T may be denoted as $x_{1,\ldots,T}$, where each $x_t \in R^d$, d being the input dimension. The objective of the forecasting system, for example, the system 102 implementing the RMDN architecture (such as model 210/250) is to predict future points of a time series y given the historical data for the time series x. In other words, the model (such as the model 210/250) is required to provide a prediction $\hat{y} = \hat{y}_{t+1}^i, \ldots, \hat{y}_{t+p}^i$, given the input sequence $(x_1, \ldots, x_t)$ with the help of a non-linear mapping function $f_{net}$, where p is the prediction length.

The MDN (for example, the MDN layer 216 of FIG. 2A/the MDN layer 256a-Encoder, 256b-Decoder of FIG. 2B) models a mixture of Gaussians with the latent representation $z_t$ of the input time series data $x_{1,\ldots,t}$. If the latent representation $z_t$ of the input time series is obtained using standard LSTM, then such a model is called as a sparse LSTM-MDN (illustrated in FIG. 2A). If $z_t$ is obtained using standard ED then such a model is referred to as a sparse ED-MDN (illustrated in FIG. 2B).

Every forecasted point of the time series is associated with its own mixture of Gaussians. Let K be the total number of mixtures, then each component $k \in \{1, \ldots, K\}$ in the mixture is associated with coefficient $\rho_k$, mean $\mu_k$ and standard deviation $\sigma_k$.

The mathematical description of the proposed sparse MDN models is as follows. The input sequence (represented as 212 in FIG. 2A and 252 in FIG. 2B) is first passed through a feedforward layer (for example, layer 214 of FIG. 2A/layer 254 of FIG. 2B) with r units and weight matrix $W_f$. The output of the feedforward layer for input $x^i$ at time step t (of dimension 1×d) is given by:

$$\hat{x}_t^i = f_{ReLU}(W_f(X_t^i)^T + b_f), \quad (1)$$

Where $f_{ReLU}(.) = \max(.,0)$ and $W_f$ is r×d.

The reduction in dimensionality is achieved by selecting the number of units in feedforward layer $r \leq d/2$. The feature selection in an unsupervised manner from the feedforward layer is achieved by imposing a Lasso penalty on the weights of feedforward layer to make the input connections sparse. The $L_1$ constraint or the Lasso penalty induces sparsity on the weights $W_f$ of the fully connected feedforward layer by restricting a fraction of the weights in $W_f$ to be close to zero and thus results in unsupervised feature selection.

The intermediate term $\hat{x}^i$ is then fed to the subsequent LSTM or ED layers (for example, the MDN layer 216 of FIG. 2A/the MDN layer 256a-Encoder, 256b-Decoder of FIG. 2B). Let $z_t$ denote the latent representation of the input obtained by the LSTM or ED. The parameters of the mixture of K Gaussians are estimated as follows:

$$\rho_t, K(z_t) = \text{softmax}(W_\rho \cdot z_t + b_\rho),$$

$$\mu_t, K(z_t) = W_\mu \cdot z_t + b_\mu,$$

$$\sigma_t, K(z_t) = \exp(W_\sigma \cdot z_t + b_\sigma) \quad (2)$$

where $t \in [t+1, \ldots, t+p]$, and $W_\sigma$, $W_\mu$, $W_\rho$, are the learned parameters of the MDN with $\mu_{*,k}$ and $\sigma_{*,k}$, representing mean and standard deviation of the kth Gaussian component, respectively.

The coefficients $\rho_{t',k}$ play the role of probabilities. The softmax ensures that each value $\rho_{t',k} \in [0,1]$ and $\Sigma_{k+1}^K = 1$ at any time step t' and exp function is used to ensure that the standard deviation term $\sigma$ is always positive. The outputs of the MDN (represented as 218 in FIG. 2A/258 in FIG. 2B) as formulated in (2) model the conditional distribution of the future values $y_{t+1}, \ldots, _{t+p}$ to be predicted given the latent representation $z_t$ expressed as follows:

$$P(y_{t+1}, \ldots, _{t+p}|x_1, \ldots, l_t); z_t) = \Pi_{t'=t+1}^{t+p} \Sigma_{k=1}^K \rho_{t',k}(z_t) N_t (y_t; \mu_{t',k}(z_t), \sigma_{t',k}(z_t)) \quad (3)$$

Thus, the MDN layer outputs a well-defined joint probability distribution obtained for all the time steps in the forecast time horizon. The model parameters are learned by minimizing the negative log-likelihood of the distribution in (3) as shown below:

$$L_{RMDN} = -\frac{1}{N}\sum_{i=1}^{N} \log P(y_{t+1,\ldots,t+p}^i | x_{1,\ldots,t}^i; z_t^i) \quad (4)$$

where superscript i denotes the P sample, and N is the total number of samples in the train set. It is to be noted that $\sigma$, $\rho$, and $\mu$ depends upon the latent representation $z_t$ of the input time series obtained using the parameters of LSTM or ED.

The final loss function along with the $L_1$ constraint or the Lasso penalty on the weights of the feedforward dimensionality layer is thus given by:

$$L = L_{RMDN} + \frac{\lambda}{d \times r}\|Wf\|_1 \quad (5)$$

The regularization parameter $\lambda$ controls the level of sparsity in $W_f$.

Since mixture of Gaussian distribution model a wide class of distributions, RMDNs may be better equipped to capture trend shifts and variability in the data. To get prediction at time t, a Gaussian mixture k with the one having highest value of probability $\rho_{t,k}$ is selected at 218 in FIG. 2A and 258 in FIG. 2B. The selected Gaussian mixture's mean $\mu_{t,k}$ is selected as the prediction and the standard deviation $\sigma_{t,k}$ confidence estimate of the prediction at 218 in FIG. 2A and 258 in FIG. 2B.

Herein, it should be understood that the loss function value is computed using eqn (5) for the training data set and the validation data set. The training loss function value (computed using the training data set) is used to update the weights of the sparse RMDN, whereas the validation loss function value (computed using the validation data set) is used to select the best iteration. In an example embodiment, the validation loss function value can be computed for every iteration or after every 'k' iterations. In an embodiment, the training loss function value is computed at each iteration and used to update the weights of the sparse RMDN.

An example flow diagram illustrating the method for time series prediction is illustrated and described with reference to FIGS. 3A-3B.

Figure 3A:
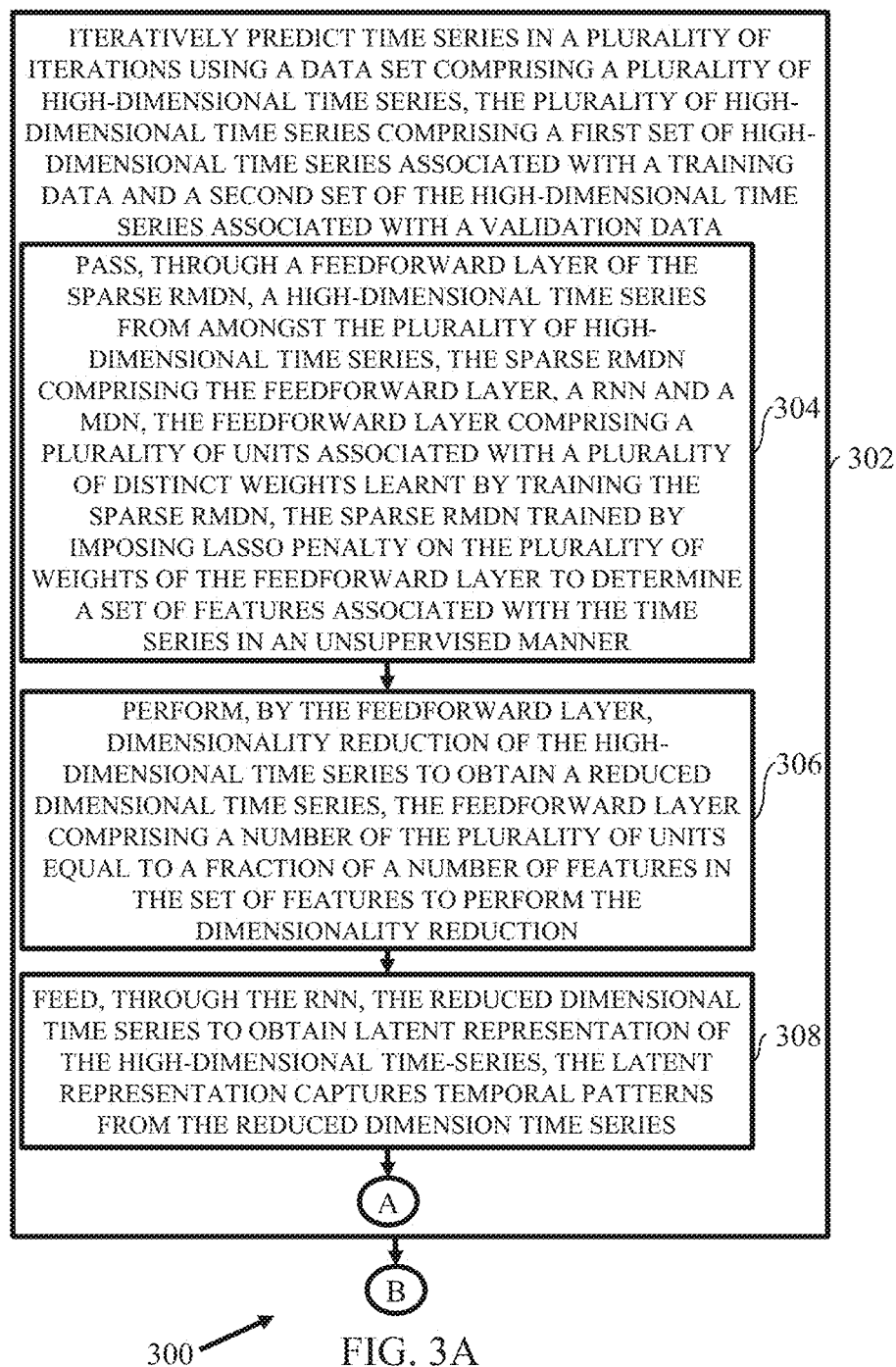
FIGS. 3A and 3B illustrate a flow diagram for time series prediction using sparse RMDN, in accordance with some embodiments of the present disclosure.
Figure 3B:
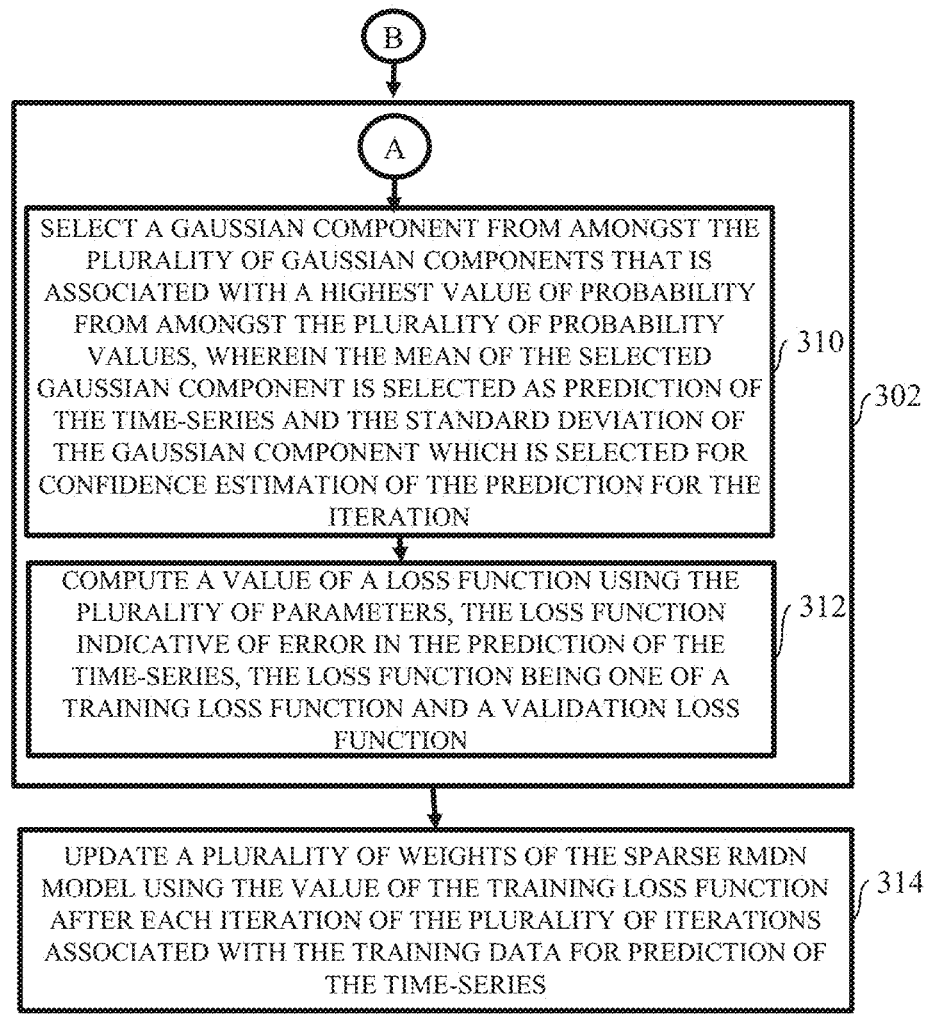
Figure 5A:
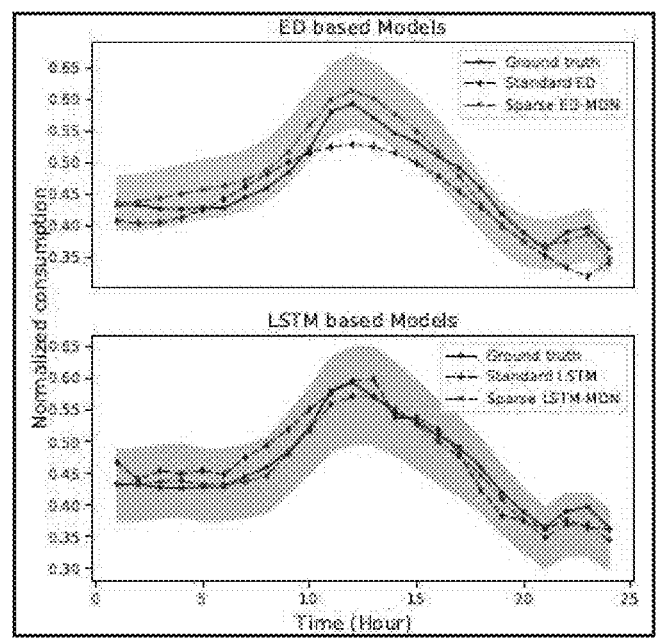
FIGS. 5A-5E illustrates plots representing performance of RMDN models in accordance with some embodiments of the present disclosure.
Figure 5B:
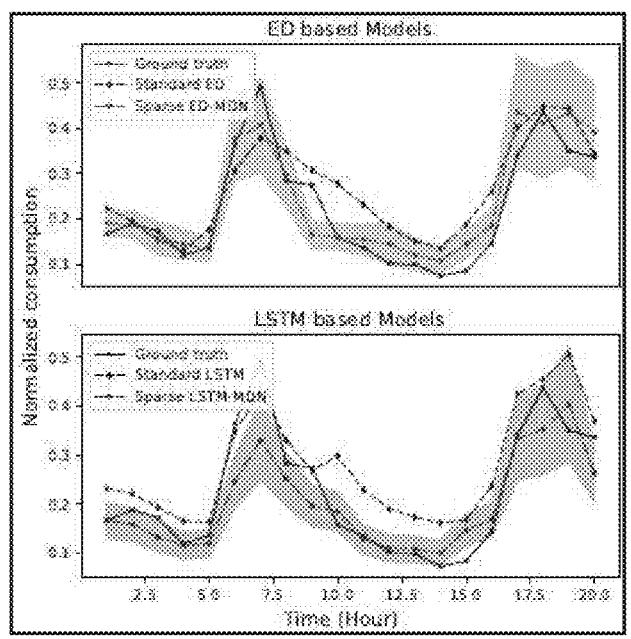
Figure 5C:
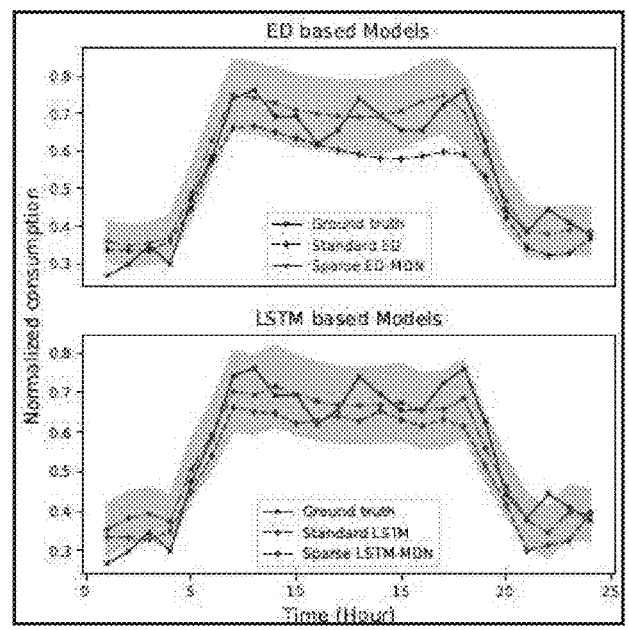
Figure 5D:
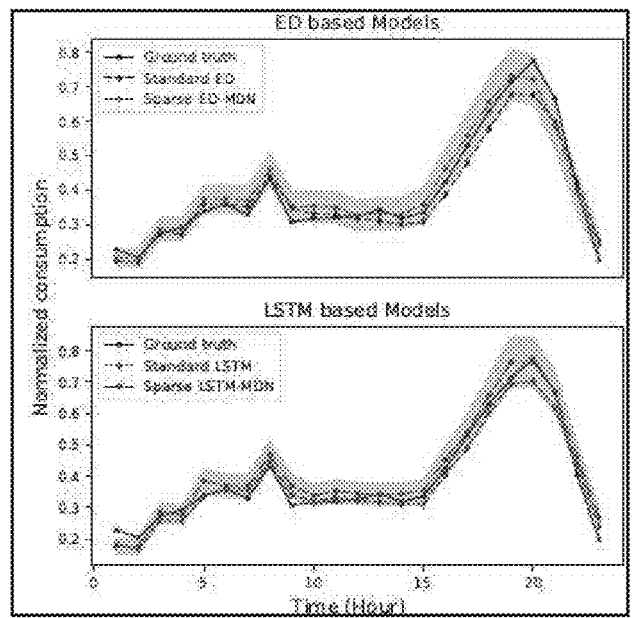
Figure 5E:
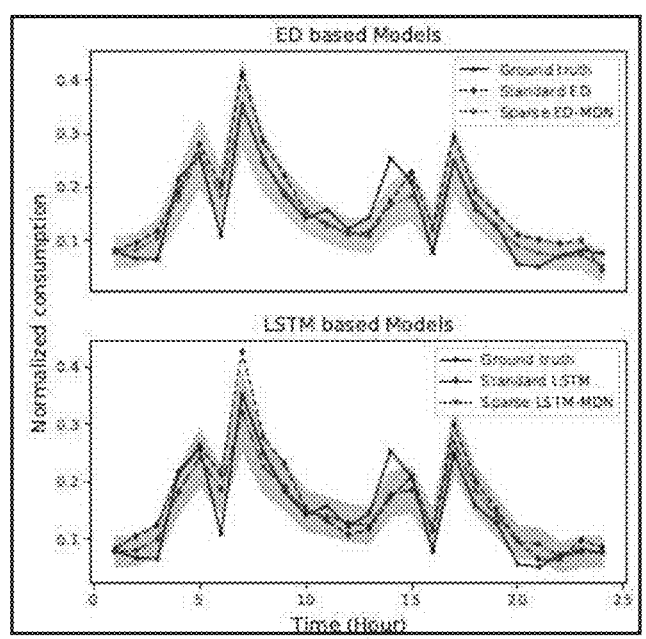

Referring now to FIGS. 3A-3B a flow diagram of a method 300 for time series prediction using a sparse RMDN is described, in accordance with an example embodiment.

The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof. In an embodiment, the method 300 depicted in the flow chart may be executed by a system, for example, the system 102 of FIG. 1. In an example embodiment, the system 102 may be embodied in an exemplary computer system.

As previously described with reference to FIGS. 2A, 2B, the sparse RMDN includes the feedforward layer, a RNN and a MDN. At 302, method 300 includes iteratively predicting time series in a plurality of iterations using a data set comprising a plurality of high-dimensional time series. The plurality of high-dimensional time series includes a first set of high-dimensional time series associated with a training data and a second set of the high-dimensional time series associated with a validation data. The training data facilitates in training the system (or the RMDN) for prediction of time series associated with the data set. For instance, if the time series prediction is pertaining to a problem of load forecasting (as will be described later), then the data set may include data pertaining to load forecasting problem, and so on. Once the RMDN model is trained using the training data, the RMDN model is validated using the validation data (or unseen data). It will be understood that the model is validated with the unseen data to avoid over fitting of the (training) data on the model.

The training and validation of the RMDN model is performed in multiple iterations using the training data and the validation data respectively. Each of the iterations of the training and validation may be performed by following steps 304-314, as will be described later in the description below.

At 304, a high-dimensional time series from amongst a plurality of high-dimensional time series is passed through a feedforward layer of the sparse RMDN. As will be understood, during the training of the RMDN model, the first set of high-dimensional time series are passed through the RMDN model.

At 306, the feedforward layer performs dimensionality reduction of the high-dimensional time series to obtain a reduced dimensional time series. As is described previously, the feedforward layer includes a number of units equal to a fraction of the number of features in the set of features to perform the dimensionality reduction. For instance, the feedforward layer may include number of units equal to, for instance one of d/2, d/3, d/4, d/5, and so on, where d is the number of input features. The plurality of units are associated with a plurality of distinct weights learnt by training the sparse RMDN. The sparse RMDN is trained by imposing LASSO penalty on the plurality of weights of the feedforward layer to determine a set of features associated with the time series in an unsupervised manner. The set of features which are important for prediction in the context of time series prediction. For example, the set of (important) features for load prediction may include, but are not limited to, Hour of day, Day of week, Temperature, Cloud cover, Historical consumption values (Consumption at previous day same time, Consumption at two days before same time, Consumption at one week before at same time and so on). If the load prediction is for individual house, then along with the above mentioned features appliance level consumption information may also be important, in which case the set of (important) features may include, for instance, for Home a dataset cellar outlets, fridge range, and so on.

In an embodiment, the set of features may be determined by assigning an importance score to each of the d features present in the input data (e.g. the high dimensional time series) and sorting them in decreasing order. A pseudo code for determination of the set of features is described below, which takes in the weights $W_f$ corresponding to the feedforward layer of the trained neural network and outputs $d_s$ important features. As is understood, $W_f$ is of dimension d×r, where r is the number of neurons (or units) in the feedforward layer.

---
Pseudocode
---

Input: Wf;
Output: D;
1:   Initialize matrix I of dimension d × r with zeroes;
2:   Initialize vector D of length d with zeroes;
3:   for each neuron k in r, do;

4:   Compute mean weight $\mu_k = \frac{1}{d}\sum_{j=1}^{d} W_{jk}$

5:   for each input feature j in d, do;
6:   if $W_{jk} \geq \mu_k$ then, $I_{jk} = 1$;
7:   for each input feature j in d do;

8:   set $D_j = D_j = \dfrac{\sum_{k=1}^{r} I_{jk}}{r}$

---

The feedforward layer feeds the reduced dimensional time series through the RNN to obtain latent representation of the high-dimensional time-series. The latent representation captures temporal patterns from the reduced dimensional time series.

At 308, the latent representation of the high-dimensional time series is fed to a mixture of Gaussians having a plurality of Gaussian components to predict a plurality of parameters associated with the plurality of Gaussian components in the mixture. The plurality of parameters includes a plurality of probability values, a plurality of mean values and a plurality of standard deviation values associated with the plurality of the Gaussian components. At 310, a Gaussian component is selected from amongst the plurality of Gaussian components that is associated with a highest value of probability from amongst the plurality of probability values. The mean of the selected Gaussian component is selected as prediction of the time-series and the standard deviation of the Gaussian component is selected for confidence estimation of the prediction for the iteration.

At 312, a training loss function value is computed using the plurality of parameters. The loss function value is indicative of error in the prediction of the time-series. At 314, the weights of the sparse RMDN model are updated using the train set loss function value after each iteration of the first set of high-dimensional time-series.

In an embodiment, upon training, RMDN model is validated by iteratively executing the steps 304-312 in a set of iterations using the validation data. In an embodiment, the validation of the RMDN model includes iteratively predicting the time series in the second plurality of iterations using the validation data set. Based on the predicted time series, a validation loss function indicative of error in validation is computed. The validation loss function is computed by determining a conditional probability distribution for a plurality of time steps in a forecast time horizon associated with the time-series based on the estimated set of parameters obtained during validation. In an embodiment, an iteration is selected from amongst the plurality of iterations for time series prediction based on the validation loss function value.

An example scenario for the disclosed system and method being utilized for load forecasting problem is provided in the description below.

In an example scenario, the disclosed system and method have been utilized for solving the problem of load forecasting in electricity markets. For load forecasting, the disclosed system (for example the system 102) models sparse RMDN that is capable of performing automatic feature selection of a high-dimensional input data in an unsupervised fashion. The model aims at delivering p-step ahead load forecasts with reliable accuracy. Said model is useful for forecasting loads on hourly, daily or weekly time-scales.

As described with reference to FIGS. 2A-2B, an input time series for load forecasting may be assumed to be $x = (x_1, \ldots, x_t)$. The input time sequence is of length t with each $x_k \in R_d$, $k \in \{1, \ldots, t\}$, with d being the input dimension.

The objective of the forecasting model is to predict the future p points of a time series. For example, a neural network, characterized by a non-linear function, $f^{net}(\bullet)$, will predict $\hat{y} = \hat{y}_{t+1}^i, \ldots, \hat{y}_{t+p}^i$, given the input sequence $(x_1, \ldots, x_t)$ The RMDN network is trained with several input-output pairs, $\{x^i, y^i\} = \{(x_1^i, \ldots, x_t^i, (y_{t+p}^i, \ldots y_{t+p}^i)\}$ with $i \in \{1, \ldots, N\}$ and an error between the predicted output $(\hat{y}_{t+1}^i, \ldots, \hat{y}_{t+p}^i)$ and the actual output (ground truth) $(y_{t+p}^i, \ldots y_{t+p}^i)$ is minimized. The error computed is then used to update the weights W of the RMDN network during the training process. In the load forecasting problem the input sequence $(x_1, \ldots, x_t)$ constitute data from recent past and each dimension of $x_k$ could represent features like past loads, weather, time-of-day or other related information needed to forecast future loads.

A neural network for time-series prediction is the long short term memory (LSTM). A LSTM is a recurrent neural network with a cell or memory, an input, output and a forget gate. The role of the cell is to extract temporal relations of the input sequence and the gates regulate the information flow into the LSTM cell. A standard LSTM network consists of many layers of stacked LSTM units. On the other hand, in sparse LSTM network, the stacked LSTM layers are preceded by a fully connected feedforward layer. The role of the feedforward layer is to perform feature selection or dimensionality reduction of the input data using a regularization technique. In an embodiment, this is achieved by imposing a Lasso penalty on the weights of the feedforward layer to make the input connections sparse. The Lasso penalty is added to the mean squared error objective to constitute the validation loss function.

The mathematical description of the sparse LSTM network is as follows. Let $W_f$ and r denote the weights and number of neurons of the feedforward layer. Then, the output of the feedforward layer for input $\{x_i\}$ is given by $$\tilde{x}^i = f_{ReLU}(W_f(x^i)), \quad (1)$$

where $f_{ReLU}(.)=\max(.,0)$. If the weights of the subsequent LSTM layers are denoted by $W_l$, then the output of the LSTM layer is expressed as, $$\hat{y}^i = f_{lstm}(\tilde{x}^i; W_{fl}) \quad (2)$$

The error between expected and predicted output is then given by $$e^i = \|\hat{y}^i - y^i\|^2 \quad (3)$$

Error terms are added for N samples and a Lasso regularization term are added to compute the validation loss function L of the sparse LSTM as follows, $$L = \frac{1}{N}\sum_{i=1}^{N} e^i + \frac{\lambda}{d \times r} \|Wf\|_1 \quad (4)$$

where $\lambda$ is the regularization parameter. The minimization problem involves finding the optimal weights W* such that $$W^* = \underset{W}{\mathrm{argmin}}\ L$$

An encoder-decoder (ED) is a sequence to sequence (seq2seq) learning model. They contain a pair of underlying RNNs called encoder and decoder that are trained simultaneously. Given a input time sequence $x=(x_1, \ldots, x_t)$, the encoder learns a coded representation of the input in the form of a hidden state representation z. The decoder, that has the same structure as the encoder, initializes its hidden state with z and makes a prediction $(\hat{y}_{t+1}, \ldots, \hat{y}_{t+p})$. The overall process can be thought of as a non-linear mapping of the input time series x to a fixed-dimensional vector z using an encoder function $f^{enc}(\bullet)$, followed by another non-linear mapping of z using a decoder function $f^{dec}(\bullet)$, to predict a time series of length of p. The sparse ED network is similar to the sparse LSTM network in the sense that there is a fully connected feedforward layer that precedes the ED architecture. This feedforward layer performs feature selection on the input data in exactly the same manner as described in the functioning of the sparse LSTM model. Specifically, let $W_e$ and $W_d$ denote the weights of the encoder and decoder parts of the ED respectively. Then, the output of the encoder is given by, $$z^i = f_{enc}(\tilde{x}^i; W_e)$$

where $\tilde{x}^i = f_{ReLU}(W_{fl} \cdot x^i)$

The hidden representation $z^i$ is used to initialize the decoder, which then outputs the prediction vector $\hat{y}^i = f_{dec}(z^i \cdot W_d)$. Thereafter, the computation of the validation loss function and back-propagation takes place exactly as described in Equations (3) and (4) with $W=[W_f, W_e, W_d]$ The feedforward layer and subsequent RNN layers in sparse LSTM and sparse ED are trained in an end-to-end manner using the stochastic gradient descent algorithm. At the completion of the training process, the weights in $W_f$ ensure that each unit of the feedforward layer has access only to a subset of the input features. Therefore, each dimension of $\tilde{x}_i^i$ in Equation (1) is a linear combination of a relatively small number of input features effectively resulting in unsupervised feature selection. In summary, the temporal relations in the input data are well captured by the inner RNN layers while the outer feedforward layer captures the point wise dependencies among the dimensions.

An example of comparison of the performance of the proposed sparse recurrent MDNs, namely, sparse LSTM-MDN and sparse ED-MDN with the traditional RNN based forecasting approaches, namely Standard LSTM and Standard ED is described further in the description below. For the purpose of comparison, following variants of the proposed sparse RMDN models are considered:

(1) Standard LSTM and ED with feedforward dimensionality reduction layer called as sparse LSTM and sparse ED respectively. (2) Sparse LSTM-MDN and sparse ED-MDN without the feedforward dimensionality reduction layer referred to as LSTM-MDN and ED-MDN respectively. (3) An ensemble of the predictions from eight forecasting approaches considered in this exposition referred to as Ensemble. The evaluation of the proposed models was done on three energy market datasets with MSE and MAPE as metrics.

AEMOTM dataset: This dataset is from the Australian energy market operator (AEMO) and has load information corresponding to five regions of the Australian energy market. Of these, we considered data from a single region spanning September 2014 to July 2015. The load information is available at half-hour interval with corresponding weather data. The task is to predict days ahead load of the region at half-hour frequency based on weather, calendar and past consumption values as features in input data.

UMass smart HomeATM dataset: This dataset contains three year electricity consumption records of a household. Data is available every half-hour, between years 2014 and 2016. We considered measurements from January to April 2014. Apart from overall load consumption, the dataset contains readings of 31 electrical appliances from the household and weather information of the region. Further, since the weather details are available only at one-hour interval other features were also sampled at the same frequency. The recordings of 17 appliances were zero and hence were discarded. The task is to predict day-ahead consumption of the household at hourly frequency given past consumption and other features of the input data.

PowerTAC™ dataset: PowerTAC™ is an annual trading agent tournament that simulates crucial elements of a smart-grid system. As a part of the Power-TAC environment, retail customers of varied nature are simulated whose energy consumption pattern depends on a large range of factors from weather to tariff subscribed. For the purpose of this work, we simulated data from three customer models from the PowerTAC™ environment called MedicalCenter-1™ CentervilleHomes™ and BrooksideHomes™. This dataset has energy usage at one-hour intervals along with corresponding weather and calendar information. The task is to predict day-ahead load at an hourly frequency.

During the training process, each dataset is divided into train, validation and test sets. Input sequence of length t were generated by dividing a large time series data into small subsequences or windows of length t with shift s. Categorical features like time-of-day were represented using one-hot encoding. Min-max normalization was performed for all features on the train, validation and test sets by obtaining minimum and maximum values from the train set data. The exact values of these parameters are presented in Table 1 (FIG. 4).

In the present example scenario, Adam optimizer was used for optimizing the weights of the networks. The best architecture was selected as the one with least negative log likelihood for MDNs as in Equation (5) and the one with least mean squared error for non-MDN models on the hold-out validation set. To this end, a grid search over several hyper-parameter values was performed.

Specifically, the following choices for various hyper-parameters were considered: number of layers L∈{1,2,3}, number of hidden units h per layer in the range of 50-300 in steps of 50, number of units in the feedforward layer r∈{d/5, d/4, d/3, d/2}, learning rate $I_r$∈{0:01, 0:001, 0:0001}, λ∈{0: 01, 0:001, 0:0001} number of mixtures in the mixture of Gaussians K∈{2, 3, 4, 5} and a dropout rate of 0.3 over feedforward connections of the RNN.

The performance of the RMDN models are summarized in Table 2 (FIG. 4) and FIGS. 5A-5E. The results reported in Table 2 are obtained by performing the experiments once. Predictions from the forecasting models along with their ground truths are plotted in FIGS. 5A-5E. More specifically, predictions p for the MDN-based forecasting models along with a one-sigma confidence band at the estimated confidence are plotted in FIGS. 5A-5E. One can form the following inferences from the results.

1. Sparse LSTM and sparse ED outperformed standard LSTM and standard ED in both metrics on most of the datasets, thus showing the efficacy of having feedforward dimensionality reduction layer with L1 penalty on its weights to reduce the dimensions. Recall that feedforward layer with sparsity constraint on its weights Wf performs unsupervised feature selection, thus resulting in improved performance.

2. LSTM-MDN and ED-MDN are performing better than standard LSTM and standard ED in MAPE metric on most of the datasets. They are also performing better than Sparse LSTM and sparse ED, which demonstrates the ability of MDNs to model the variability and trend shifts present in the data.

3. Sparse LSTM-MDNs and sparse ED-MDNs based forecasting models are performing better than other forecasting approaches on most of the datasets. As discussed earlier, this suggests that sparse RMDNs based forecasting approaches are superior in capturing the variability of the load or demand profile and handling high-dimensional data better than other approaches.

4. Sparse RMDN based forecasting models are performing better than all other approaches in terms of MSE metric on all datasets except AEMO dataset. The AEMO dataset differs from the other datasets we have used in that it exhibits lesser variability. Both these observations suggest that sparse RMDNs are better suited to peaks and high variability than their non-sparse, non-MDN counterparts.

5. One can observe from the FIGS. 5(B), 5(C) and 5(D) that the estimated confidence σ is low whenever the error between the predicted demand and ground truth is low and the σ is high otherwise. The model thus provides a confidence measure on its prediction ability which is very useful in many real-world applications.

6. The Ensemble formed using the eight proposed forecasting models is performing better than all other baselines and it is very robust.

7. While the sparsity constraint improves the performance of both the ED and LSTM models, the improvement depends on the dataset and the performance metric, and does not show a clear trend.

Figure 6:
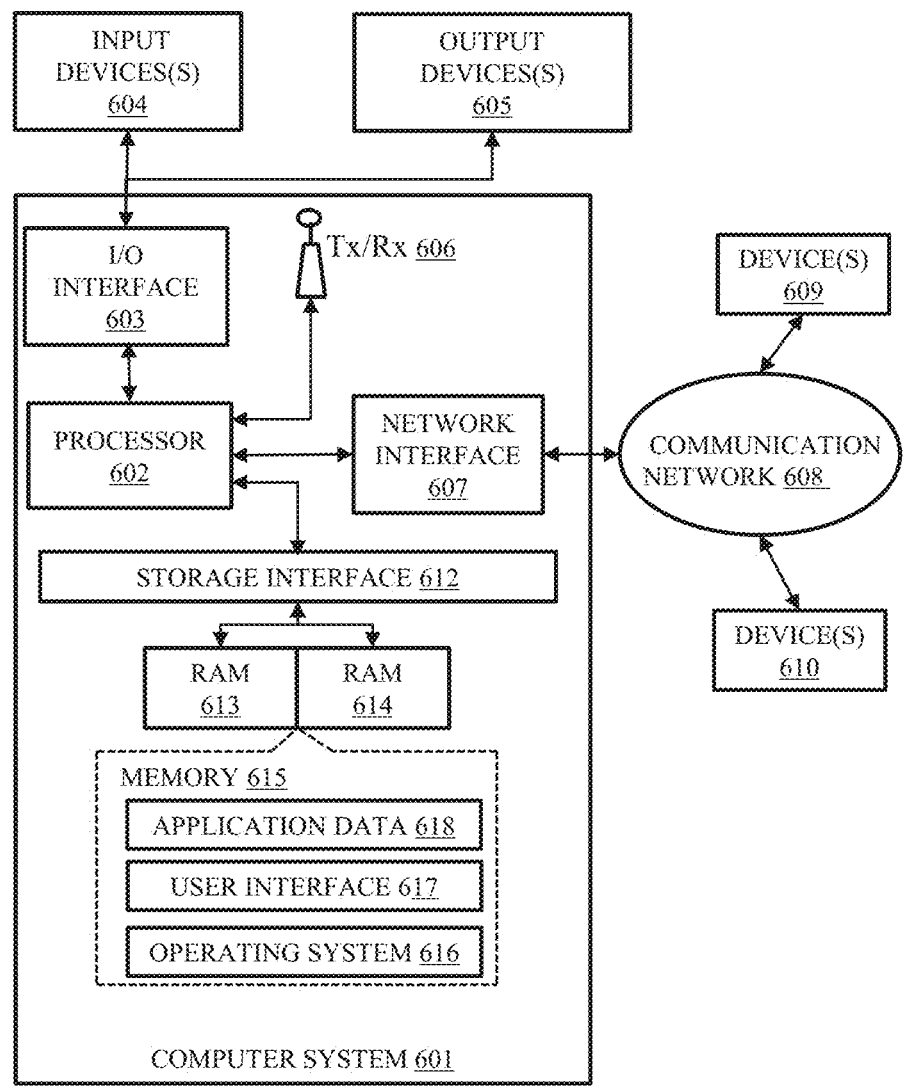
FIG. 6 illustrates a block diagram of an exemplary computer system for implementing embodiments consistent with the present disclosure.

FIG. 6 is a block diagram of an exemplary computer system 601 for implementing embodiments consistent with the present disclosure. The computer system 601 may be implemented in alone or in combination of components of the system 102 (FIG. 1). Variations of computer system 601 may be used for implementing the devices included in this disclosure. Computer system 601 may comprise a central processing unit ("CPU" or "hardware processor") 602. The hardware processor 602 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 602 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609 and 610. These devices may include, without limitation, personal computer(s), server(s), fax machines, printers, scanners, various mobile devices such as cellular telephones, smartphones (e.g., Apple i Phone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 616, user interface application 617, user/application data 618 (e.g., any data variables or data records discussed in this disclosure), etc. The operating system 416 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 601 may store user/application data 618, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provide method and system for time series forecasting using RMDN model. For example the embodiments discloses two variants of sparse RMDN for time series forecasting, that have the ability to handle high-dimensional input features, capture trend shifts and high variability present in the data, and provide a confidence estimate of the forecast. In an embodiment, the RMDN includes a feedforward layer, which performs dimensionality reduction or feature selection in an unsupervised manner by inducing sparsity on the weights of the feedforward layer. The resultant low-dimensional time series is then fed through recurrent layers to capture temporal patterns. These recurrent layers also aid in learning the latent representation of the input data. Thereafter, an MDN is used to model the variability and trend shifts present in the input and it also estimates the confidence of the predictions. The models are trained in an end-to-end fashion and the efficacy of the proposed models is demonstrated on three publicly available datasets from energy markets. The use of the feedforward layer for feature selection improves the ability to handle high-dimensional data.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for time-series prediction using a sparse recurrent mixture density networks (RMDN) model, the method comprising:
  iteratively predicting, via one or more hardware processors, time series in a plurality of iterations using a data set comprising a plurality of high-dimensional time series, the plurality of high-dimensional time series comprising a first set of high-dimensional time series associated with a training data and a second set of the high-dimensional time series associated with a validation data, each iteration of the plurality of iterations comprising:
  passing, through a feedforward layer of the sparse RMDN model, a high-dimensional time series from amongst the plurality of high-dimensional time series, the sparse RMDN model comprising the feedforward layer, a recurrent neural network (RNN) and a mixture density network (MDN), the feedforward layer comprising a plurality of units associated with a plurality of distinct weights learnt by training the sparse RMDN model, the sparse RMDN model being trained by imposing Lasso penalty on the plurality of weights of the feedforward layer to determine a set of features associated with the time series in an unsupervised manner, wherein the Lasso penalty comprises imposing sparsity on the plurality of weights of the feedforward layer by restricting a fraction of the weights to be close to zero to result in unsupervised feature selection, wherein the feedforward layer for the unsupervised feature selection improves ability to handle high-dimensional time series data, wherein the sparse RMDN model comprises one of a sparse LSTM-MDN (long-short term memory-MDN) model and a sparse ED-MDN (encoder-decoder-MDN) model, and wherein the sparse RMDN model captures trend shifts and variability present in the data set using the MDN;
  performing, by the feedforward layer, dimensionality reduction of the high-dimensional time series to obtain a reduced dimensional time series, the feedforward layer comprising a number of the plurality of units equal to a fraction of the number of features in the set of features to perform the dimensionality reduction;
  feeding, through the RNN, the reduced dimensional time series to obtain latent representation of the high-dimensional time-series, the latent representation captures temporal patterns from the reduced dimensional time series;
  feeding, through the MDN the latent representation of the high-dimensional time series to a mixture of Gaussians comprising a plurality of Gaussian components to predict a plurality of parameters associated with the plurality of Gaussian components in the mixture, the plurality of parameters comprising a plurality of probability values, a plurality of mean values and a plurality of standard deviation values associated with the plurality of the Gaussian components;
  selecting a Gaussian component from amongst the plurality of Gaussian components that is associated with a highest value of probability from amongst the plurality of probability values, wherein the mean of the selected Gaussian component is selected as prediction of the time-series and the standard deviation of the Gaussian component is selected for confidence estimation of the prediction for the iteration;
  computing a value of a loss function indicative of error in the prediction of the time-series using the plurality of parameters, the loss function being one of a training loss function and a validation loss function wherein computing the value of the loss function comprises:
    determining a conditional probability distribution for a plurality of time steps in a forecast time horizon associated with the time-series based on the plurality of parameters;
    minimizing a negative log likelihood function of the conditional probability distribution; and
    computing the loss function along with the Lasso penalty on the plurality of weights of the feedforward layer based on the negative likelihood function, wherein, the negative log likelihood function of the conditional probability distribution is represented by the equation:

$$L_{RMDN} = -\frac{1}{N}\sum_{i=1}^{N} \log P(y^i_{t+1,\ldots,t+p} \mid x^i_{1,\ldots,t}; z^i_t),$$

and where the loss function comprises:

$$L = L_{RMDN} + \frac{\lambda}{d \times r}\|Wf\|_1$$

where, superscript i denotes the $i^{th}$ sample, and N is the total number of samples in a training set, x represents an input time series, y represents a time series for which future points are to be predicted given the input time series x, z represents latent representation of the input time series, Wf represents a weight matrix, $\lambda$ is a regularization parameter that controls the level of sparsity in Wf, and d×r are the dimension of the weight matrix; and
  updating, via the one or more hardware processors, a plurality of weights of the sparse RMDN model using the value of the training loss function after each iteration of the plurality of iterations associated with the training data for prediction of the time-series.

2. The processor implemented method of claim 1, further comprising validating the prediction by the RMDN model, wherein validating comprises:
  iteratively predicting the time series in a second plurality of iterations from amongst the plurality of iterations using the validation data set;
  computing, based on the predicted time series, the validation loss function indicative of error in validation; and
  selecting an iteration from amongst the second plurality of iterations for time series prediction based on the validation loss function value.

3. The processor implemented method of claim 1, wherein the plurality of parameters associated with the Gaussian component are estimated based on the equations:

$$\rho_t, K(z_t) = \text{softmax}(W_\rho \cdot z_t + b_\rho),$$

$$\mu_t, K(z_t) = W_\mu \cdot z_t + b_\mu,$$

$$\sigma_t, K(z_t) = \exp(W_\sigma \cdot z_t + b_\sigma)$$

where $t \in [t+1, \ldots, t+p]$, and $W_\sigma$, $W_\mu$, $W_\rho$, are learned parameters of the MDN with $\mu.,k$ and $\sigma.,k$, representing mean and standard deviation of the kth Gaussian component, respectively, and z represents latent representation of input time series and t represents time step.

4. The processor implemented method of claim 1, wherein the conditional probability distribution is represented as:

$$P(y_{t+1,\ldots,t+p} | x_{1,\ldots}, l_t); z_t = \prod_{t'=t+1}^{t+p} \sum_{k=1}^{K} \rho_{t',k}(z_t) N(y_{t'}; \mu_{t',k}(z_t), \sigma_{t',k}(z_t))$$

where $y_{t+1} \ldots ; t_{+p}$ are values of the time series to be predicted.

5. The processor implemented method of claim 1, wherein the sparse RMDN model comprises one of a sparse LSTM model and a sparse ED model,
wherein the sparse LSTM model comprises the feedforward layer with Lasso sparsity constraints on the plurality of distinct weights and a LSTM as the RNN, and
wherein the sparse ED comprises the feedforward layer with LASSO sparsity constraints on the plurality of distinct weights and an encoder decoder as the RNN.

6. A system for time-series prediction using a sparse recurrent mixture density networks (RMDN) model, comprising:
one or more memories; and
one or more first hardware processors, the one or more first memories coupled to the one or more first hardware processors, wherein the one or more first hardware processors are configured to execute programmed instructions stored in the one or more first memories to:
iteratively predict time series in a plurality of iterations using a data set comprising a plurality of high-dimensional time series, the plurality of high-dimensional time series comprising a first set of high-dimensional time series associated with a training data and a second set of the high-dimensional time series associated with a validation data, wherein in each iteration of the plurality of iterations, the one or more hardware processors are configured by the instructions to:
pass, through a feedforward layer of the sparse RMDN model, a high-dimensional time series from amongst the plurality of high-dimensional time series, the sparse RMDN model comprising the feedforward layer, a recurrent neural network (RNN) and a mixture density network (MDN), the feedforward layer comprising a plurality of units associated with a plurality of distinct weights learnt by training the sparse RMDN model, the sparse RMDN model being trained by imposing Lasso penalty on the plurality of weights of the feedforward layer to determine a set of features associated with the time series in an unsupervised manner, wherein the Lasso penalty comprises imposing sparsity on the plurality of weights of the feedforward layer by restricting a fraction of the weights to be close to zero to result in unsupervised feature selection, wherein the feedforward layer for the unsupervised feature selection improves ability to handle high-dimensional time series data, wherein the sparse RMDN model comprises one of a sparse LSTM-MDN (long-short term memory-MDN) model and a sparse ED-MDN (encoder-decoder-MDN) model, and wherein the sparse RMDN model captures trend shifts and variability present in the data set using the MDN;
perform, by the feedforward layer, dimensionality reduction of the high-dimensional time series to obtain a reduced dimensional time series, the feedforward layer comprising a number of the plurality of units equal to a fraction of the number of features in the set of features to perform the dimensionality reduction;
feed, through the RNN, the reduced dimensional time series to obtain latent representation of the high-dimensional time-series, the latent representation captures temporal patterns from the reduced dimensional time series;
feed, through the MDN, the latent representation of the high-dimensional time series to a mixture of Gaussians comprising a plurality of Gaussian components to predict a plurality of parameters associated with the plurality of Gaussian components in the mixture, the plurality of parameters comprising a plurality of probability values, a plurality of mean values and a plurality of standard deviation values associated with the plurality of the Gaussian components;
select a Gaussian component from amongst the plurality of Gaussian components that is associated with a highest value of probability from amongst the plurality of probability values, wherein the mean of the selected Gaussian component is selected as prediction of the time-series and the standard deviation of the Gaussian component is selected for confidence estimation of the prediction for the iteration;
compute a value of a loss function indicative of error in the prediction of the time-series using the plurality of parameters, the loss function being one of a training loss function and a validation loss function wherein computing the value of the loss function comprises:
determining a conditional probability distribution for a plurality of time steps in a forecast time horizon associated with the time-series based on the plurality of parameters;
minimizing a negative log likelihood function of the conditional probability distribution; and
computing the loss function along with the Lasso penalty on the plurality of weights of the feedforward layer based on the negative likelihood function, wherein, the negative log likelihood function of the conditional probability distribution is represented by the equation:

$$L_{RMDN} = -\frac{1}{N} \sum_{i=1}^{N} \log P(y_{t+1,\ldots,t+p}^i | x_{1,\ldots,t}^i; z_t^i),$$

and where the loss function comprises:

$$L = L_{RMDN} + \frac{\lambda}{d \times r} \|Wf\|_1$$

where, superscript i denotes the $i^{th}$ sample, and N is the total number of samples in a training set, x represents an input time series, y represents a time series for which future points are to be predicted given the input time series x, z represents latent representation of the input time series, Wf represents a weight matrix, λ is a regularization parameter that controls the level of sparsity in Wf, and d×r are the dimension of the weight matrix; and update a plurality of weights of the sparse RMDN model using the value of the training loss function after each iteration of the plurality of iterations associated with the training data for prediction of the time-series.

7. The system of claim 6, wherein the one or more hardware processors are further configured by the instructions to validate the prediction by the RMDN model, and wherein to validate, the one or more hardware processors are further configured by the instructions to:

iteratively predict the time series in a second plurality of iterations from amongst the plurality of iterations using the validation data set;

compute, based on the predicted time series, the validation loss function indicative of error in validation; and select an iteration from amongst the second plurality of iterations for time series prediction based on the validation loss function value.

8. The system of claim 6, wherein the plurality of parameters associated with the Gaussian component are estimated based on the equations:

$\rho_t,K(z_t)=\text{softmax}(W_\rho \cdot z_t+b_\rho)$, $\mu_t,K(z_t)=W_\mu \cdot z_t+b_\mu$, $\sigma_t,K(z_t)=\exp(W_\sigma \cdot z_t+b_\sigma)$ where t∈[t+1, . . . , t+p], and $W_\sigma$, $W_\mu$, $W_\rho$, are learned parameters of the MDN with µ.,k and σ.,k, representing mean and standard deviation of the kth Gaussian component, respectively, and z represents latent representation of input time series and t represents time step.

9. The system of claim 6, wherein the conditional probability distribution is represented as:

$$P(y_{t+1,\ldots, t+p}|x_{1,\ldots}l_t); z_t = \prod_{t'=t+1}^{t+p} \sum_{k=1}^{K} \rho_{t',k}(z_t) N(y_{t'}; \mu_{t',k}(z_t), \sigma_{t',k}(z_t))$$

where $y_{t+1}$ . . . ;$t_{+p}$ are values of the time series to be predicted.

10. The system of claim 6, wherein the sparse RMDN model comprises one of a sparse LSTM model and a sparse ED (encoder-decoder) model, wherein the sparse LSTM model comprises the feedforward layer with Lasso sparsity constraints on the plurality of distinct weights and a LSTM as the RNN, and wherein the sparse ED model comprises the feedforward layer with Lasso sparsity constraints on the plurality of distinct weights and an encoder decoder as the RNN.

11. One or more non-transitory machine readable information storage mediums comprising one or more instructions which when executed by one or more hardware processors cause:

iteratively predicting, via one or more hardware processors, time series in a plurality of iterations using a data set comprising a plurality of high-dimensional time series, the plurality of high-dimensional time series comprising a first set of high-dimensional time series associated with a training data and a second set of the high-dimensional time series associated with a validation data, each iteration of the plurality of iterations comprising:

passing, through a feedforward layer of the sparse RMDN model, a high-dimensional time series from amongst the plurality of high-dimensional time series, the sparse RMDN model comprising the feedforward layer, a recurrent neural network (RNN) and a mixture density network (MDN), the feedforward layer comprising a plurality of units associated with a plurality of distinct weights learnt by training the sparse RMDN model, the sparse RMDN model being trained by imposing Lasso penalty on the plurality of weights of the feedforward layer to determine a set of features associated with the time series in an unsupervised manner, wherein the Lasso penalty comprises imposing sparsity on the plurality of weights of the feedforward layer by restricting a fraction of the weights to be close to zero to result in unsupervised feature selection, wherein the feedforward layer for the unsupervised feature selection improves ability to handle high-dimensional time series data, wherein the sparse RMDN model comprises one of a sparse LSTM-MDN (long-short term memory-MDN) model and a sparse ED-MDN (encoder-decoder-MDN) model, and wherein the sparse RMDN model captures trend shifts and variability present in the data set using the MDN;

performing, by the feedforward layer, dimensionality reduction of the high-dimensional time series to obtain a reduced dimensional time series, the feedforward layer comprising a number of the plurality of units equal to a fraction of the number of features in the set of features to perform the dimensionality reduction;

feeding, through the RNN, the reduced dimensional time series to obtain latent representation of the high-dimensional time-series, the latent representation captures temporal patterns from the reduced dimensional time series;

feeding through the MDN, the latent representation of the high-dimensional time series to a mixture of Gaussians comprising a plurality of Gaussian components to predict a plurality of parameters associated with the plurality of Gaussian components in the mixture, the plurality of parameters comprising a plurality of probability values, a plurality of mean values and a plurality of standard deviation values associated with the plurality of the Gaussian components;

selecting a Gaussian component from amongst the plurality of Gaussian components that is associated with a highest value of probability from amongst the plurality of probability values, wherein the mean of the selected Gaussian component is selected as prediction of the time-series and the standard deviation of the Gaussian component is selected for confidence estimation of the prediction for the iteration;

computing a value of a loss function indicative of error in the prediction of the time-series using the plurality of parameters, the loss function being one of a training loss function and a validation loss function wherein computing the value of the loss function comprises:

determining a conditional probability distribution for a plurality of time steps in a forecast time horizon associated with the time-series based on the plurality of parameters;

minimizing a negative log likelihood function of the conditional probability distribution; and computing the loss function along with the Lasso penalty on the plurality of weights of the feedforward layer based on the negative likelihood function, wherein, the negative log likelihood function of the conditional probability distribution is represented by the equation:

$$L_{RMDN} = -\frac{1}{N}\sum_{i=1}^{N} \log P(y^i_{t+1,\ldots,t+p} \mid x^i_{1,\ldots,t}; z^i_t),$$

and where the loss function comprises:

$$L = L_{RMDN} + \frac{\lambda}{d \times r}\|Wf\|_1$$

where, superscript i denotes the $i^{th}$ sample, and N is the total number of samples in a training set, x represents an input time series, y represents a time series for which future points are to be predicted given the input time series x, z represents latent representation of the input time series, Wf represents a weight matrix, $\lambda$ is a regularization parameter that controls the level of sparsity in Wf, and d×r are the dimension of the weight matrix; and updating, via the one or more hardware processors, a plurality of weights of the sparse RMDN model using the value of the training loss function after each iteration of the plurality of iterations associated with the training data for prediction of the time-series.

* * * * *